M. F. MANGELSDORFF.
APPARATUS FOR DEHYDRATING.
APPLICATION FILED NOV. 15, 1917.
1,299,492.
Patented Apr. 8, 1919.
2 SHEETS—SHEET 1.
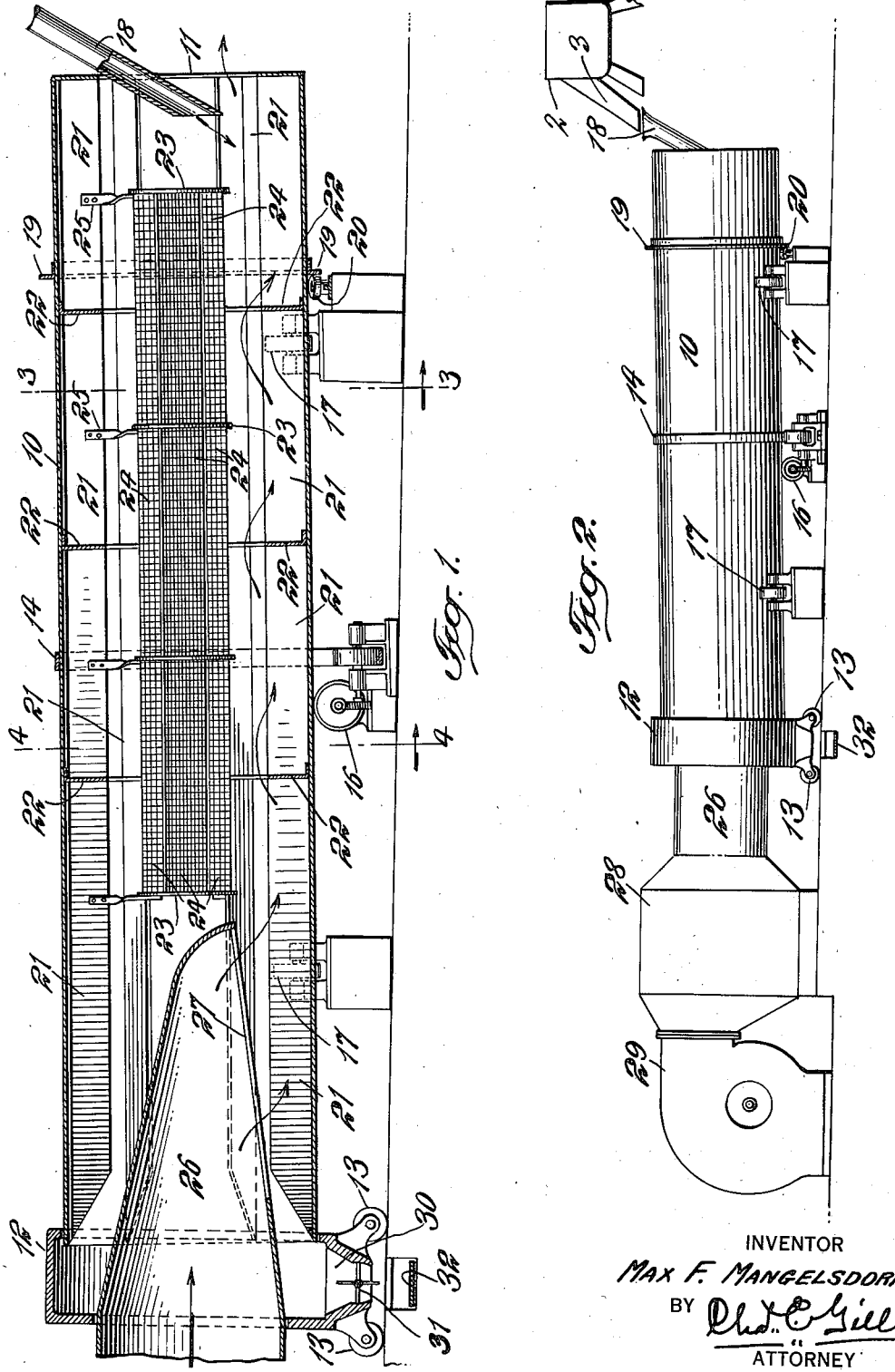
INVENTOR
MAX F. MANGELSDORFF
BY
ATTORNEY

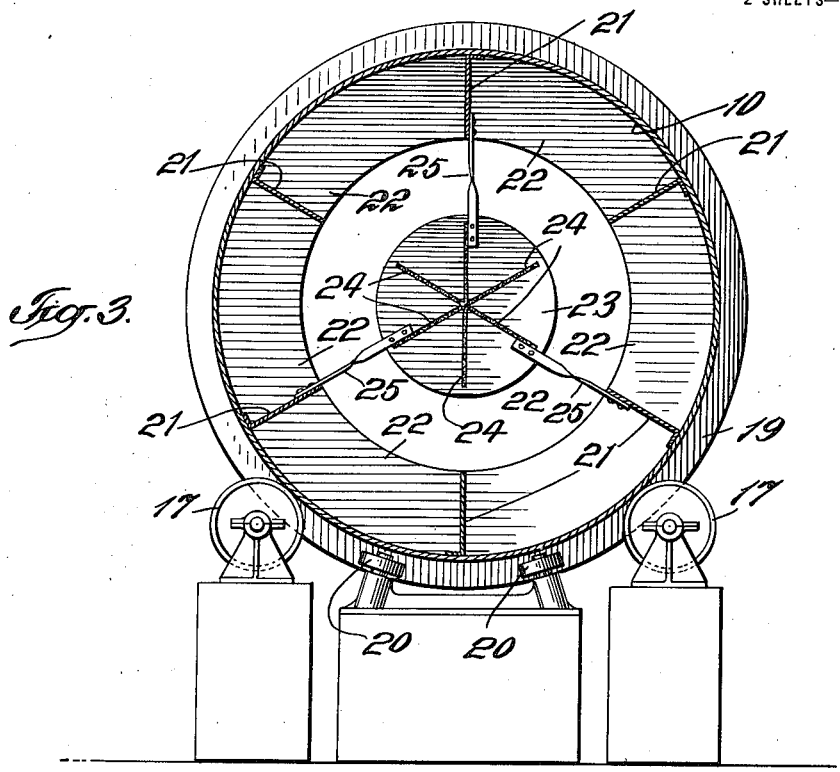
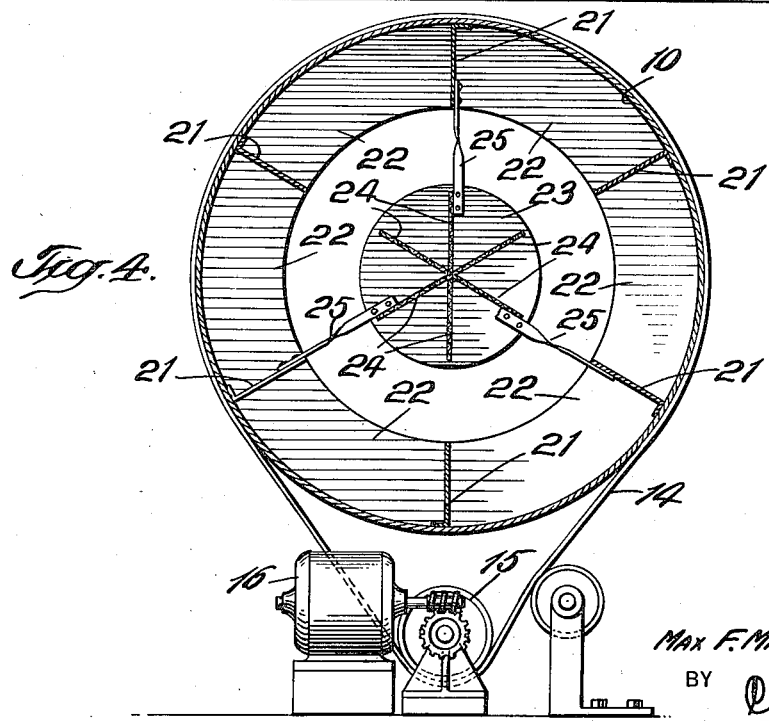

UNITED STATES PATENT OFFICE.

MAX F. MANGELSDORFF, OF UNION HILL, NEW JERSEY, ASSIGNOR TO HARRY BENTZ, OF MONTCLAIR, NEW JERSEY.

APPARATUS FOR DEHYDRATING.

1,299,492.     Specification of Letters Patent.     Patented Apr. 8, 1919.

Application filed November 15, 1917. Serial No. 202,187.

*To all whom it may concern:*

Be it known that I, MAX F. MANGELSDORFF, a citizen of the United States, and a resident of Union Hill, in the county of Hudson and State of New Jersey, have invented certain new and useful Improvements in Apparatus for Dehydrating, of which the following is a specification.

The invention relates to methods of and apparatus for the drying of vegetable and other material in or reduced to reasonably small pieces, as, for illustration cossettes, shreds, slices, or the like; and my invention provides a new and highly efficient method or process, as well as apparatus, for the drying of such materials comprising in the preferred practice the continuous travel of a body of said material from one end to the other of a rotating drum, the constant turning over of said material on its passage through said drum from the inlet end thereof to the discharge therefrom for the finished material and the forcible passage through said drum, from the outlet end thereof for the material, of a body of properly heated air, said air being regulated as to temperature and volume and passing, under requisite pressure, through said drum and the material traveling through the same, and the air moving in counter direction to the travel of the material and thoroughly engaging the surfaces of the same. The air first engages the driest portion of the material approaching the point of discharge therefor and thence through the moving body of material and finally being discharged from the apparatus, with the use of which my invention may be carried into effect, at or nearly at the temperature of the outside air and with its moisture content increased to or nearly to the point of saturation at that temperature. I will preferably regulate the volume of air automatically with the use of a humidostat, and the temperature of the heated air entering the apparatus should be maintained substantially constant and at a degree suitable to the material under treatment, and this step may be attained automatically with the use of a thermostat. The process or method followed by me consists in submitting the raw material on its entrance to the drying chamber, to the action of a current of air then of high relative humidity and of a temperature but little higher than that of the material itself, and then (during the travel of the material) of gradually higher temperature and lower relative humidity progressively from the inlet of said material to its discharge from the apparatus through which it passes in substantially constant flow, until the material has become dehydrated to such a degree as is sufficient for its preservation; dehydration being slow at first and progressive, rupture of the cell walls by explosion avoided and the cell contents preserved uninjured, so that if thereafter the requisite amount of moisture be restored to the product, it will recover its original appearance, volume and flavor without loss of its nutritive properties.

In carrying out my process I introduce the material to be dehydrated in reasonably small pieces in substantially constant flow into one end of a rotating cylinder and cause the same to travel, in proper timing, to the other or discharge end thereof, and at the same time cause the passage of properly heated air through said cylinder from the discharge to the inlet end thereof, whence said air after having acted on the material under treatment escapes to the open atmosphere, and during the travel of the material through the rotating cylinder, the material is turned over and over and over again, so that all of its surfaces may become exposed to the air passing through the cylinder. The heated air progressively acts, commencing with the discharge end of the cylinder, upon the driest portions of the material, and then on its further travel through the cylinder upon the approaching progressively more moist portions of the material, and this I regard as important, because if the highly heated air acted first on the more moist or raw portions of the material, the dehydrating effect would not be at all satisfactory.

The apparatus of my invention comprises an elongated cylinder, means for placing the same in uniform rotation, means for feeding the material to be treated into one end of said cylinder, means of special character within and extending centrally of said cylinder, for insuring the proper turning over of the material during its travel and the separation or displacement of the pieces thereof from one another and the exposure of the surfaces of said pieces, and means at the discharge end of said cylinder for delivering the properly heated air under pressure to the cylinder.

The invention will be fully understood from the detailed description hereinafter presented, reference being had to the accompanying drawings, in which:

Figure 1 is a vertical longitudinal section, partly broken away, through dehydrating apparatus embodying my invention;

Fig. 2 is a side elevation, on a smaller scale, of the same;

Fig. 3 is a vertical transverse section through the same, taken on the dotted line 3—3 of Fig. 1, and Fig. 4 is a vertical transverse section through the same, taken on the dotted line 4—4 of Fig. 1.

In the drawings, 2 designates a vegetable cutter of any known or convenient type having an outlet spout 3 for discharging the material, cutter 2 being designed to reduce the material to reasonably small pieces, as for instance cossettes, shreds, slices or the like. 10 designates a cylindrical shell or casing which extends substantially horizontally and is inclined from its inlet to its outlet end, and said shell or casing 10 has an opening 11 at its inlet end and discharges at its opposite end into a substantially cylindrical cast metal head 12, which is mounted on rollers 13 and receives the adjacent end of the shell or casing 10. The shell or casing 10 may be of sheet metal and during the use of the apparatus said shell or casing 10 is given a substantially constant uniform rotation on its longitudinal axis by means of a belt 14 extending around the shell or casing and a band wheel 15 and being driven by a motor of any suitable type 16. The shell or casing 10 is supported at opposite sides of its lower portion on rollers 17 suitably mounted, as indicated in the drawings, and receiving the shell or casing 10 at opposite sides of the center of the lower portion thereof. My invention is not limited to any special means for driving or supporting the casing 10, it being sufficient for the purposes of my invention that said shell or casing may be rotated during the travel in one direction therethrough of the material to be treated and the passage therethrough in the opposite direction of the heated air. The shell or casing 10 is inclined so that there may be an automatic travel of the material to be treated from the delivery spout 18 therefor to the discharge end of said casing, and since said casing is arranged on an incline and that the head 12 is mounted on rollers, I provide means for preventing the shell or casing from riding toward said head 12 and pushing the same along the floor, and these means comprise a flange 19 encircling the shell or casing 10 and small rollers 20 having fixed bearings and engaging the rear side of said flange 19, and thereby preventing any travel in a downward direction of the shell or casing.

In the shell or casing 10 I provide a suitable number of longitudinal radial blades 21 which extend substantially from one end to the other of the shell or casing 10 and may be in continuous pieces or in alined sections, as may be desired. The blades 21 are secured to the inner surface of the shell or casing 10 and extend inwardly a suitable distance, and the spaces between the blades 21 are separated by open disks, formed in one piece or in sections as may be required, into suitable subdivisions, as shown in Fig. 1, said disks, numbered 22, conforming to the interior outline of the shell or casing 10 and extending from the inner wall of said casing to the inner edges of the blades 21, as shown in Fig. 3. The blades 21 and open disks or rings 22 constitute a structure extending around the inner walls of the shell or casing 10, and this structure is quite essential in baffling the flow of the material under treatment through the shell or casing 10 and in turning said material over and over and over again during its passage and also in baffling the counter current of heated air traveling through the material within said shell or casing.

Centrally within the shell or casing 10 I mount a longitudinal structure comprising end and intermediate disks 23 supporting radial longitudinal wire cloth or perforated blades 24, the blades 24 forming angular pockets between them, and these pockets being subdivided by the intermediate disks 23. The structure composed of the disks 23 and blades 24 are secured by arms 25 to the blades 21, as shown more clearly in Fig. 3, and therefore during the rotation of the shell or casing 10 the disks 23 and blades 24 have a corresponding rotation. Furthermore, the disks 23 coöperate with the rings 22 in baffling and mixing the current of drying air, thus insuring that the air current shall be substantially uniform as to temperature and humidity throughout any given cross section thereof, and thus promoting uniformity in the drying operation and uniformity of product. In this connection, it will be seen that the air current must contract as it passes the rings 22 and disks 23 and that it will expand again immediately after passing one or the other of these obstructions. This alternate contraction and expansion produces eddies which mix the air very thoroughly, preventing the formation of pockets or strata of differing humidity or temperature. The rings 22 and disks 23 also produce the stirring and baffling action on the air at the points where the resulting expansion and eddies in the air current cause it to impinge sharply against the material in the buckets and pockets on the upper sides of the rings and disks. As the material in the buckets and pockets is in a continual state of agitation with constantly changing surface, the air mixes with the surface layer and acts on it with high efficiency.

The head 12 is at the discharge end of the shell or casing 10 and is open at its inner side to receive the adjacent end of said shell or casing and at its outer side is open to snugly receive the nozzle 26 through which the heated air is delivered to the shell or casing 10. The nozzle 26 is closed at its top, inner end and side portions and open at its lower part, as at 27, for the exit of the heated air downwardly into the discharge end portion of the shell or casing 10. The nozzle 26 may be of sheet metal and it is stationary and it receives its air from a heater 28 of customary type, and said air is driven into the heater and thence through the shell or casing 10 under proper pressure by means of a blower 29, which is also of usual type. The air entering the shell or casing 10 from the nozzle 26 discharges through the opening 11 at the inlet end of the casing or that end into which the material to be treated is delivered through the nozzle 18 or other suitable means. At the lower side of the head 12 is formed an outlet chute 30 controlled by a rotary winged door 31, of known type, and below the chute 30 may be provided a conveying belt 32 for receiving the treated material and conveying the same to any suitable point of delivery.

In the operation of the apparatus of my invention the material in or reduced to reasonably small pieces is fed through the spout 18 to the higher or receiving end of the shell or casing 10, and this shell or casing is set in rotation, and heated air from the nozzle 26 is caused to travel through the shell or casing 10 and the material which may at the time be passing through the casing toward the discharge chute 30. The material is delivered through the spout 18 into the shell or casing 10 in substantially constant volume and at no time in sufficient quantity to more than partly fill the lower side of said shell or casing 10, and this material due to the rotation and inclination of the shell or casing 10 is caused to be turned over and over again and to travel toward the discharge chute 30. In order to facilitate the repeated turning over and displacement of the pieces of the material from one another, I provide the blades 21 which, during the rotation of the shell or casing 10, gather and lift up the pieces of material and permit them to fall downwardly to the lower portion of the shell or casing 10 after said blades have reached the requisite elevation to dump said pieces of material. For the purpose of preventing an undue movement of the pieces of material under treatment toward the discharge end of the cylinder 10, I intercept the same between the blades 21 and the ring disks 22, which coöperate with said blades in forming buckets adapted to carry the material upwardly and hold it until the proper time for the discharge of the material in a downwardly direction. The central structure composed of the disks 23 and perforated blades 24 is important in that it intercepts the material falling from the rising buckets formed by the blades 21 and ring disks 22 and receives said material, breaking the fall thereof and carrying the same around and finally dumping the same into the lower portion of the shell or casing 10. The material conveyed through the shell or casing 10 is repeatedly turned over and the pieces thereof separated from one another by the action of the blades 21 and ring disks or partitions 22, and this turning over action of said material and the separation of the pieces thereof from one another is further carried out by the central structure composed of the disks 23 and blades 24, and in addition said central structure breaks the fall of the pieces of material from the buckets formed by the blades 21 and ring disks 22. The central structure formed by the disks 23 and blades 24 coöperates with the pockets formed by the blades 21 and ring disks 22 in effecting a retardation of the flow of the material to the discharge end of the shell or the casing 10, in the repeated turning over and over and over again of the pieces of material and their separation from each other during their travel through the shell or casing 10 and in the exposure of the surfaces of said pieces of material to the heated air traveling from the nozzle 26 through said shell or casing. I secure a proper movement of the pieces of material traveling in one direction through the shell or casing 10 and the exposure of their surfaces to the heated air moving in an opposite direction through said shell or casing, and all this is important, since the purpose is to secure an effectual dehydration of the vegetable material, and to do so in such manner that the action of dehydration shall be at first slow and then progressive from the inlet to the outlet end of the shell or casing 10, so that rupture of the shell walls of the material may be avoided and that if at a later time the requisite amount of moisture be restored to the product, such product will recover its original appearance, volume and flavor without loss of its nutritive properties. The method pursued by me with the use of the apparatus hereinbefore described will be substantially understood from the foregoing description, and it involves the reduction of the vegetable material to pieces of small size, the longitudinal movement of the said material in substantially constant flow, from a source of supply, through a drying chamber, the constant lifting and turning over and displacement of the pieces of said material during said movement of the same, so as to effect the repeated exposure of the surfaces of said pieces and the wide separation of said pieces from one another, and causing a body of heated air, under pressure, to move through said chamber and against said pieces of material, said air entering said chamber at the discharge end thereof for said material and passing thence to the inlet end of said chamber for said material. My process and apparatus admits of modifications as will be apparent, and hence I do not desire to limit my invention to precise details of form and construction, otherwise than the appended claims may require. The process carried out by me is substantially continuous and is economical and efficient, and several of the machines may be kept in operation and under proper observation by a single employee.

What I claim as my invention and desire to secure by Letters-Patent, is:

1. Apparatus for dehydrating vegetable material and the like, comprising an elongated rotary cylindrical casing affording a drying chamber and inclined to effect the travel of said material through the same by gravity, means for supplying said material to the higher end of said casing, a discharge therefor at the lower end of said casing, means within said casing for lifting and turning over the pieces of material, means for retarding the travel of the same through said casing, and means for delivering heated air into the discharge end of said casing and causing the same to flow through the casing and against the pieces of material traveling therethrough.

2. Apparatus for dehydrating vegetable material and the like, comprising an elongated rotary cylindrical casing affording a drying chamber and inclined to effect the travel of said material through the same by gravity, means for supplying said material to the higher end of said casing, a discharge at the lower end of said casing, a series of buckets within said casing and connected thereto for lifting and turning over the pieces of material, means for retarding the travel of the same through said casing, and means for delivering heated air into the discharge end of said casing and causing the same to flow through the casing and against the pieces of material traveling therethrough.

3. Apparatus for dehydrating vegetable material and the like, comprising an elongated rotary cylindrical casing affording a drying chamber and inclined to effect the travel of said material through the same by gravity, means for supplying said material to the higher end of said casing, a discharge at the lower end of said casing, a series of buckets within said casing and connected thereto for lifting and turning over the pieces of material and retarding the travel of the same through said casing, and means for delivering heated air into the discharge end of said casing and causing the same to flow through the casing and against the pieces of material traveling therethrough, said buckets being formed by longitudinal blades secured to the inner surface of said casing and transverse disk rings suitably spaced apart and subdividing the spaces between said blades into said buckets.

4. Apparatus for dehydrating vegetable material and the like, comprising an elongated cylindrical casing affording a drying chamber and inclined to effect the travel of said material through the same by gravity, means for supplying said material to the higher end of said casing, a discharge therefor at the lower end of said casing, buckets on the inner wall of said casing for lifting and dumping and thereby turning over the pieces of material, a series of central longitudinal pockets to receive portions of said material dumped from said buckets and then dumping the same into the body of said chamber, and means for delivering heated air into the discharge end of said casing and causing the same to flow through the casing and against the pieces of material traveling therethrough.

5. Apparatus for dehydrating vegetable material and the like, comprising an elongated cylindrical casing affording a drying chamber and inclined to effect the travel of said material through the same by gravity, means for supplying said material to the higher end of said casing, a discharge therefor at the lower end of said casing, buckets on the inner wall of said casing for lifting and dumping and thereby turning over the pieces of material, a series of central longitudinal pockets to receive portions of said material dumped from said buckets and then dumping the same into the body of said chamber, and means for delivering heated air into the discharge end of said casing and causing the same to flow through the casing and against the pieces of material traveling therethrough, said pockets being formed of a series of longitudinal perforated blades and disks subdividing the spaces between said blades into the pockets.

6. Apparatus for dehydrating vegetable material and the like, comprising an elongated cylindrical casing affording a drying chamber and inclined to effect the travel of said material through the same by gravity, means for supplying said material to the higher end of said casing, a discharge therefor at the lower end of said casing, buckets on the inner wall of said casing for lifting and dumping and thereby turning over the pieces of material, a series of central longitudinal pockets to receive portions of said material dumped from said buckets and then dumping the same into the body of said chamber, and means for delivering heated air into the discharge end of said casing and causing the same to flow through the casing and against the pieces of material traveling therethrough, said buckets being formed by longitudinal blades secured to the inner surfaces of said casing and transverse disk-rings subdividing the spaces between said blades into said buckets, and said pockets being formed by longitudinal perforated radial blades and disks subdividing the spaces between the said radial blades into said pockets.

7. Apparatus for dehydrating vegetable material and the like, comprising an elongated rotary cylindrical casing affording a drying chamber and inclined to effect the travel of said material through the same by gravity, means for supplying said material to the higher end of said casing, a stationary head receiving the lower end of said casing and having a discharge at the lower side thereof for said material, means within said casing for lifting and turning over the pieces of material during the travel of the same through the casing, and means for delivering heated air into the discharge end of said casing and causing the same to flow through the casing and against the pieces of material traveling therethrough, and said means comprising a blower, a heater and a nozzle which projects through said head and has a discharge opening at its lower side.

8. Apparatus for dehydrating vegetable material and the like, comprising an elongated rotary cylindrical casing affording a drying chamber, means for effecting the travel of said material through said chamber, means for supplying said material to one end of said casing, a discharge therefor at the other end of said casing, means within said casing and connected therewith for, during the rotation of the casing, lifting and dumping the said pieces of material along a series of stages during the travel of the material through the casing, whereby the pieces of material become repeatedly turned over and separated from one another, means for delivering heated air into the discharge end of said casing and causing the same to flow through the casing and against the pieces of material traveling therethrough, and means for baffling and intimately mixing the air and the material.

9. Apparatus for dehydrating vegetable material and the like, comprising an elongated rotary cylindrical casing affording a drying chamber, means for effecting the travel of said material through said chamber, means for supplying said material to one end of said casing, a discharge therefor at the other end of said casing, means within said casing and connected therewith for, during the rotation of the casing, lifting and dumping the said pieces of material along a series of stages during the travel of the material through the casing, whereby the pieces of material become repeatedly turned over and separated from one another, means connected with the casing and movable therewith for catching portions of the falling material and carrying and redumping the same into the body of said chamber, and means for delivering heated air into the discharge end of said casing and causing the same to flow through the casing and against the pieces of material traveling therethrough.

10. Apparatus for dehydrating vegetable material and the like, comprising an elongated rotary cylindrical casing affording a drying chamber, means for effecting the travel of said material through said chamber, means for supplying said material to one end of said casing, a discharge therefor at the other end of said casing, means within said casing and connected therewith for, during the rotation of the casing, lifting and dumping the said pieces of material along a series of stages during the travel of the material through the casing, whereby the pieces of material become repeatedly turned over and separated from one another, means connected with the casing and movable therewith for catching portions of the falling material and carrying and redumping the same into the body of said chamber, and means for delivering heated air into the discharge end of said casing and causing the same to flow through the casing and against the pieces of material traveling therethrough, said means for first lifting and dumping the pieces of material comprising a series of buckets on the inner wall of said casing and carried thereby, and said means for receiving portions of said material and redumping the same comprising a central structure connected with the casing and having a series of pockets into which the material falls and is carried and then from which the same is dumped into the lower portion of the drying chamber.

11. Apparatus for dehydrating vegetable material and the like, comprising a rotatable cylindrical casing constituting a drying chamber and inclined to effect the travel of said material through the same by gravity, means for supplying said material to the higher end of the said casing, means for passing heated air through said casing in the direction opposite to the longitudinal movement of the material, and baffling means in said casing for retarding and mixing the air with the material flowing through the casing.

12. Apparatus for dehydrating vegetable material and the like, comprising a rotatable cylindrical casing constituting a drying chamber and inclined to effect the travel of said material through the same by gravity, means for supplying said material to the higher end of the said casing, means for passing heated air through said casing in the direction opposite to the longitudinal movement of the material, and a series of baffling plates in said casing so disposed as to mix the air into the material flowing through the casing.

13. Apparatus for dehydrating vegetable material and the like, comprising an elongated rotary casing constituting a drying chamber and inclined to effect the travel of said material through the same by gravity, means for supplying said material to the higher end of said casing, a discharge for the material at the lower end of said casing, means for lifting and dropping the pieces while moving through the casing, and perforated blades or shelves in said casing for breaking the fall of said material.

14. In apparatus of the kind described, a rotary cylindrical casing, means in said casing for lifting and dropping the material therein, a member mounted in and arranged to rotate with said cylinder, comprising a plurality of radially disposed perforated blades adapted to intercept the falling material for the purpose described.

15. In apparatus of the kind described, a rotary cylindrical casing, a plurality of open center rings spaced apart and secured at their outer periphery to the walls of said cylinder and a plurality of disks smaller in diameter than said casing, disposed in the casing along its axis and interposed between said open center rings.

16. A cylindrical casing, means for passing heated air through the same, a plurality of baffling plates disposed along the interior walls of said cylinder and arranged to divert the air to the center of the same, and a second series of baffle plates located near the center of the cylinder and arranged to divert the air outwardly toward the cylinder walls.

Signed at New York city, in the county of New York and State of New York, this 13th day of November, A. D. 1917.

MAX F. MANGELSDORFF.

Witnesses:
ARTHUR MARION,
CHAS. C. GILL.